US010409878B2

(12) United States Patent
Sonnad et al.

(10) Patent No.: US 10,409,878 B2
(45) Date of Patent: Sep. 10, 2019

(54) ALGORITHM FOR AN AUTOMATED, COMMUNITY BASED, PERIODIC SELECTION PROCESS OF CREATIVE WORKS

(71) Applicants: Kiran Girish Sonnad, Atlanta, GA (US); Venkata Sivashankar, Chennai (IN)

(72) Inventors: Kiran Girish Sonnad, Atlanta, GA (US); Venkata Sivashankar, Chennai (IN)

(*) Notice: Subject to any disclaimer, the term of this patent is extended or adjusted under 35 U.S.C. 154(b) by 313 days.

(21) Appl. No.: 15/419,698

(22) Filed: Jan. 30, 2017

(65) Prior Publication Data
US 2017/0220690 A1 Aug. 3, 2017

Related U.S. Application Data

(60) Provisional application No. 62/288,525, filed on Jan. 29, 2016.

(51) Int. Cl.
G06F 16/9535 (2019.01)
(52) U.S. Cl.
CPC .............. G06F 16/9535 (2019.01)
(58) Field of Classification Search
CPC .......... G06F 16/24578; G06F 16/9535; G06F 16/951; G06F 16/285; G06Q 50/01
USPC ......................................... 707/748
See application file for complete search history.

(56) References Cited

U.S. PATENT DOCUMENTS

2007/0106551 A1* 5/2007 McGucken ............ G06Q 30/02 705/7.29
2013/0185143 A1* 7/2013 Damman .............. G06F 16/907 705/14.41
2014/0280251 A1* 9/2014 Somekh .............. G06F 16/9535 707/754
2014/0365207 A1* 12/2014 Convertino ......... G06F 17/2785 704/9

* cited by examiner

Primary Examiner — Hosain T Alam
Assistant Examiner — Nicholas E Allen
(74) Attorney, Agent, or Firm — The Law Office of Austin Bonderer, PC; Austin Bonderer

(57) ABSTRACT

An embodiment herein provides a work selection system that receives content from a plurality of content creators, who may submit creative work in electronic format through a network. Additionally, the work selection system may receive ratings by a plurality of evaluators. The work selection system incorporates a systematic procedure to periodically create a curated collection from the large body of work that may be submitted by the plurality of content creators on a continuous basis. The selection procedure leading to the production of the curated collection is based on the ratings provided by the plurality of evaluators. The procedure also periodically purges content less favorable to the plurality of evaluators. The content becomes available for rating immediately upon submission by the plurality of evaluators, and at the same time the work selection system ensures equality with respect to the time period a work is made available for rating, regardless of the time of submission of the work by the content creators.

13 Claims, 9 Drawing Sheets

ALGORITHM FOR AN AUTOMATED, COMMUNITY BASED, PERIODIC SELECTION PROCESS OF CREATIVE WORKS

CROSS-REFERENCE TO RELATED APPLICATIONS

This application claims priority to U.S. patent application No. 62/288,525 filed on Jan. 29, 2016, the complete disclosure of which, in its entirely, is herein incorporated by reference.

BACKGROUND

Technical Field

The embodiments herein generally relate to a system for automated selection and display of creative works, and more particularly, to a system and method of automatically selecting or rejecting, categorizing, and displaying the work into periodical collections with contributions of creative works being made at any time, and ratings being provided for these works during predetermined time periods.

Description of the Related Art

After the advent of Internet and particularly over the last few years, the amount of content available on the Internet has grown exponentially. Media companies such as publishers of periodicals, exhibitors of artwork, broadcasting channels etc. have also expanded their coverage through the Internet and beyond the traditional means of reaching to the general public such as newspapers, magazines, radio and television. The media companies follow a certain process of selection of content to be displayed to the public. In particular the media companies employ paid professionals who produce the content, curate and release them. As a result, they do not necessarily represent the opinions and preferences of the public at large. On the other hand, with social media portals users who constitute the general public publish the content. This results in large volumes of content that is poorly categorized and organized, often requiring an individual to undergo a series of searches and sifting of data in order to access any set of material that will be of interest or use. This is a direct result of content dilution and information overload. There is absence of a system that addresses the aforementioned issues of content dilution and information overload. There is no automated system available for archiving or keeping a record of contents that were once popular at a given time in the past in an easily accessible and organized manner.

Accordingly, there remains a need for a system and method of selecting, rejecting, categorizing, and displaying on a periodical basis the works submitted to the system in a manner that ensures balance and equal opportunity of selection amongst all the works submitted to the system.

SUMMARY

In view of the foregoing, an embodiment herein provides a method for automatically selecting, rejecting, categorizing, and releasing submitted works as part of a periodically curated collection a first possible time or a second possible time into the next periodically curated collection. The method includes the step of: (a) accepting the submitted work that is submitted for rating by a plurality of evaluators at a time of acceptance of the submitted work; (b) obtaining ratings from the plurality of evaluators; (c) processing an evaluation of the ratings of all submissions present in a database at a first time of release; (selecting those set of submitted works to obtain a selected set of submitted works for releasing into the periodically curated collection at the first time of release, wherein an aggregate and average ratings of the selected set of submitted works meet a predefined criteria for inclusion into a display package that comprises the selected set of submitted works and then purging the selected set of submitted works from the database; (f) continuing to make the submitted work available for ratings from the plurality of evaluators until the expiry of a predefined time interval following the time of acceptance of the submitted work, when the aggregate and the average ratings do not meet the predefined criteria;

(g) making the submitted work unavailable for ratings after the expiry of the predefined time interval following the time of acceptance of the submitted work; (h) processing an evaluation of the ratings of all submissions present in the database at a second time of release which is scheduled after the predefined time interval following the first time of release, wherein a time period when the submitted work is kept active for the ratings is equal to a time period between the first time of release and the second time of release criteria (i) selecting those set of submitted works for releasing into the periodically curated collection whose aggregate and average ratings meet the predefined criteria to be included as part of the display package comprising of selected set of submitted works, and purging the selected set of submitted works from the database; and (j) purging those submitted works from the database whose the aggregate and the average ratings are not met with the predefined criteria even after expiry of the predefined time interval during when the submitted works are kept active for ratings.

In one embodiment, a time period between subsequent times of release, and a value of the predefined time interval during when the submitted works are kept active for ratings are determined by the formula $(N-2)*Tp<Tw\leq(N-1)*Tp$ wherein N is a number of the evaluations the submitted work is required to undergo, $Tp$ is the time period between subsequent evaluations, and $Tw$ is the value of the predefined time interval during when the submitted works are kept active for ratings.

The method further includes the step of: (k) filtering each submission of the work to satisfy a minimum average rating or a minimum total rating prior to a final selection of the submitted work; and (l) disallowing any evaluator belonging to the plurality of evaluators from providing more than one rating on the submitted work.

Another aspect herein provides a work selection system. The work selection system automatically selects, rejects, categorizes, evaluates, changes the status, purges, and if selected releases the submitted work as part of a periodically curated collection. The work selection system includes a hard drive memory and a processor. The hard drive memory stores a database and a set of modules, wherein the database stores predefined criteria that decides if a submitted work forms part of a periodically curated collection or not. The processor executes the set of modules. The set of modules includes a work submission and receiving module, a rating receiving module, a dynamic time interval determination module, a status conversion module, a ratings evaluation module, a work purging module, a work selection module, a work purging module, and a periodical work displaying module. The submission receiving module that accepts the submitted works for ratings by a plurality of evaluators and records a time of acceptance of each of the submitted works. The rating receiving module receives ratings for the submitted works from the plurality of evaluators for works that are available for rating. The rating evaluation module evaluates said ratings of said submitted works by calculating at least one of total or average ratings of each submission in the database within a time period when the submitted works are to be kept available for the ratings.

The dynamic time interval determination module determines at least one of (a) the time period when the submitted works are to be kept available for the ratings or (b) a time period between a first time of release and a second time of release of the periodically curated collection, for a given number of times a submission has to be considered for being part of a display package. The work selection module selects and updates the periodically curated collection from the submitted works at the first time of release and the second time of release based on a comparison of the ratings with the predefined criteria. The periodical work displaying module periodically releases the periodically curated collection into updated display packages at the first time of release and the second time of release. The status conversion module makes each of the submitted works unavailable for rating after a lapse of a predefined time interval following each the time of acceptance of each of the submitted works. The work purging module removes from the database (a) submitted works which are selected as part of the updated display packages at the first time of release and the second time of release, and (b) submitted works whose aggregate and average ratings do not meet the predefined criteria following the first time of release and the second time of release and have also been made unavailable for rating after the lapse of the predefined time interval following each the time of acceptance of each of the submitted works.

In one embodiment, the dynamic time interval determination module determines the at least one of (a) the time period when the submitted works are to be kept available for the ratings or (b) the time period between a first time of release and the second time of release of the periodically curated collection based on the formula $(N-2)*Tp<Tw\leq(N-1)*Tp$ wherein N is a number of evaluations a submitted work is required to undergo, Tp is a time period between subsequent times of release, and Tw is the predefined time interval during when the submitted works are kept active for ratings. In another embodiment, the submission receiving module verifies the submitted works to (i) accept the submitted works when the submitted works meet predefined specifications and (ii) reject the submitted works when the submitted works do not meet the predefined specifications; and categorizes the submitted works into a specific channel for ratings by the plurality of evaluators. In yet another embodiment, the time period when the submitted work is kept active for the ratings and the time interval for periodicity of release of the submitted work are related to each other such that equality is always maintained with respect to time of exposure for ratings between the submissions of the work made at different time. In another embodiment, the work selection module categorizes each of the submission and the aggregate and average ratings at the time of release to select those submitted works whose the aggregate and average ratings meet the predefined criteria. The ratings receiving module disallows any evaluator belonging to the plurality of evaluators from providing more than one rating on the submitted work.

Yet another aspect herein provides one or more non-transitory computer readable storage mediums. The one or more non-transitory computer readable storage mediums stores one or more sequences of instructions, which when executed by one or more processors, causes automatic acceptance of submissions, categorization, and selection of the submitted works as part of a possible first or a possible next periodically curated collection. The procedure involves performing the following steps: (a) accepting a submitted work that is submitted for rating by a plurality of evaluators at a time of acceptance of the submitted work; (b) obtaining ratings from the plurality of evaluators; (c) processing an evaluation of the ratings of all submissions present in a database at a first time of release; (d) selecting those set of submitted works to obtain a selected set of submitted works for releasing into the periodically curated collection at the first time of release, wherein an aggregate and average ratings of the selected set of submitted works meet a predefined criteria for inclusion into a display package that comprises the selected set of submitted works and then purging the selected set of submitted works from the database; (e) continuing to make the submitted work available for ratings from the plurality of evaluators until the expiry of a predefined time interval following the time of acceptance of the submitted work, when the aggregate and the average ratings do not meet the predefined criteria; (f) making the submitted work unavailable for ratings after the expiry of the predefined time interval following the time of acceptance of the submitted work; (g) processing an evaluation of the ratings of all submissions present in the database at a second time of release which is scheduled after the predefined time interval following the first time of release, wherein a time period when the submitted work is kept active for the ratings is equal to a time period between the first time of release and the second time of release (h) selecting those set of submitted works for releasing into the periodically curated collection whose aggregate and average ratings meet the predefined criteria to be included as part of the display package comprising of selected set of submitted works, and purging the selected set of submitted works from the database, wherein a time period between subsequent evaluations, and a value of the predefined time interval during when the submitted works are kept active for ratings are determined by the formula $(N-2)*Tp<Tw\leq(N-1)*Tp$, wherein N is a number of the evaluations the submitted work may undergo, Tp is the time period between subsequent evaluations, and Tw is the value of the predefined time interval during when the submitted works are kept active for ratings; (i) purging those submitted works from the database whose the aggregate and the average ratings are not met with the predefined criteria even after expiry of the predefined time interval during when the submitted works are kept active for ratings.

The one or more non-transitory computer readable storage mediums storing one or more sequences of instructions further includes the step of: (j) filtering each submission of the work to satisfy a minimum average rating or a minimum total rating prior to a final selection of the submitted work; and (k) disallowing any evaluator belonging to the plurality of evaluators from providing more than one rating on the submitted work.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
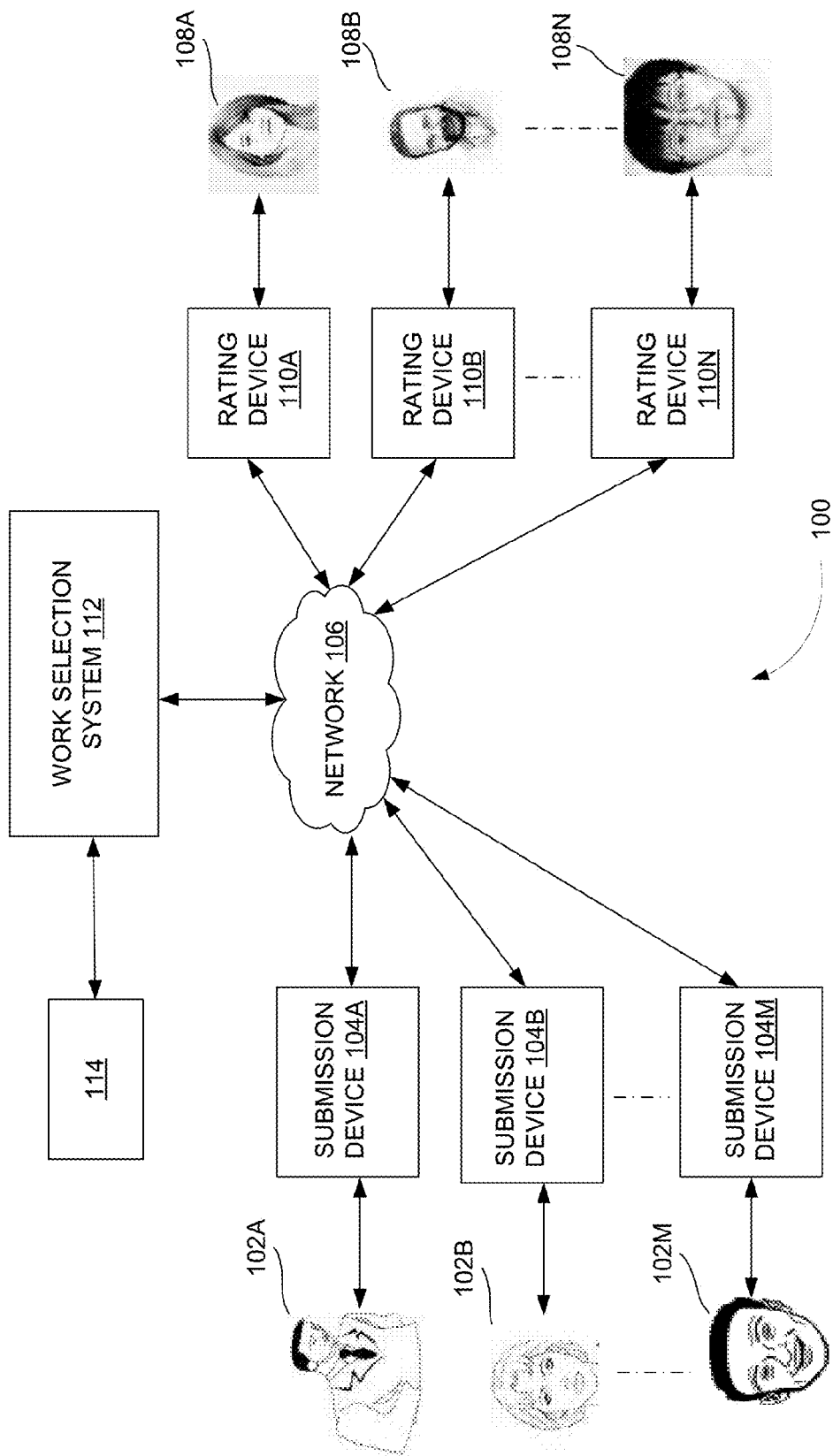
FIG. 1 illustrates a system view of content creators interacting with a work selection system to submit a work and to obtain a ratings for the work from a plurality of evaluators through a network according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method of selecting, categorizing, and displaying the set of works submitted by a plurality of content creators, on a continuous basis, into periodically curated collections on a periodical basis. The embodiments herein achieve this by providing a work selection system that may continuously receive submissions from a plurality of content creators, may obtain ratings from a plurality of evaluators for a possible selection for display as part of curated collections that are released on a periodical basis. Referring now to the drawings, and more particularly to FIGS. 1 through 7, where similar reference characters denote corresponding features consistently throughout the figures, preferred embodiments are shown.

In view of the foregoing, an embodiment herein provides a method for automatically selecting, rejecting, categorizing, and releasing submitted works as part of a periodically curated collection a first possible time or a second possible time into the next periodically curated collection. The method includes the step of: (a) making the submitted work available for ratings by a plurality of evaluators; (b) processing an evaluation of the ratings of all submitted works, leading to a possible inclusion of the submitted work for the first time into a periodically curated collection; (d) selecting the submitted work this first time as part of the periodically curated collection based on the evaluation and by requiring that the ratings corresponding to the submitted work from the plurality of evaluators meets a set of predefined criteria; (e) if selected, releasing the submitted work into the periodically curated collection, and removing the work from the system; (f) processing an evaluation of the ratings of all submitted works leading up to a possible inclusion of the submitted work as part of the next periodically curated collection, wherein the second time of release is greater than the first time of release by a time interval that is equal to a predefined time interval; (h) selecting the work as part of the next periodically curated collection based on the evaluation when the ratings corresponding to the work from the plurality of evaluators meets the predefined criteria and (i) if selected, releasing the work into the next periodically curated collection and removing the work from the system and if not selected, removing the work from the system without releasing the work into the periodically curated collection.

The method further comprises the step of: (j) making the work unavailable for rating after the predefined time interval following the time of submission of the work (i) accept the submission of the work for rating by a plurality of evaluators, when the work meets certain predefined specifications and (ii) reject the submission of the work when the work does not meet the predefined specifications; and (l) categorizing the work into a specific channel based on specifications provided during submission and properties of the submission itself.

Another aspect herein provides a work selection system. The work selection system automatically selects, rejects, categorizes, evaluates, changes the status, purges, and if selected releases the submitted work as part of a periodically curated collection. The work selection system includes a memory and a processor. The memory stores a database and a set of modules, wherein the database stores all the content including the predefined rating criteria that decides if a submitted work forms part of a periodically curated collection or not. The processor executes the set of modules. The set of modules includes a registered users module, a work submission and receiving module, a rating receiving module, a status conversion module, a ratings evaluation module, a work purging module, a work selection module, a work purging module, and finally a periodical work displaying module. The registered users module enables any registered user to login to the work selection system and consequently (1) submit content (work) or (2) provide rating to submissions by other registered users. The submission receiving module receives submissions of work from registered users and updates the database with the newly arrived content. The rating receiving module obtains ratings for submissions from a plurality of evaluators. The ratings evaluation module performs a periodical evaluation of the ratings received form the plurality of evaluators for each submission present in the database. Upon completion of the evaluation, the work selection module performs a selection event in which a selection is made from the submitted works to be included into the periodically curated work, which is based on the evaluation of the rating for each submitted work and the predefined rating criteria available in the database. Upon completion of the selection event, the periodical work displaying module processes the set of selected works into a compilation suitable for display. The status conversion module makes a submission unavailable for rating once a predefined time period has elapsed following the time of submission. Upon completion of a selection event, the work purging module removes all the submitted work from the database that is (1) either no longer available for rating, or (2) has been selected to be part of the periodically curated collection.

FIG. 1 illustrates a system view 100 of a plurality of content creators 102 A-M interacting with a work selection system 112 to submit a work and to obtain ratings from a plurality of evaluators 108A-N through a network 106 according to an embodiment herein. The plurality of content creators 102A-M interact with respective submission devices 104A-M to submit the work into the work selection system 112 through the network 106. The work may include one or more of a digital formal file, a combination of contents (e.g. a written article, a story), an article, a magazine, a cover story, a newsletter, a movie, a video, a song, content, an image, arts, paintings, and the like. The submission devices 104A-M may be devices such as a laptop, a mobile phone, a tablet, and/or a personal computer. Likewise, the plurality of evaluators 108A-N interact with the respective rating devices 110A-N to provide the ratings to the submitted work. The work selection system 112 receives each of the ratings through the network 106. The work selection system 112 may check if the work submitted by the content creators 102A-M meets predefined specifications to (i) accept the work when the work meets the predefined specifications or (ii) reject the work when the work does not meet the predefined specifications. The predefined specifications may be but are not limited to, the length of a written article or story in the form of word count or character count, the time duration of the movie or video, the size and resolution of an image or a series of images.

In another embodiment, the work selection system 112 assigns and/or enforces a predefined time period to each submitted work that determines how long the work remains available for rating. The work selection system 112 tracks the time remaining for each work submitted by the plurality of content creators 102A-M before they become unavailable for rating. In one embodiment, after the lapse of the predefined time period of acceptance of the submitted work, the work selection system 112 makes the work unavailable for ratings by the plurality of evaluators 108A-N.

The plurality of evaluators 108A-N may access and rate the work by the plurality of content creators 102A-M by interacting with the rating devices 110A-N respectively as long as the work is available for ratings. Each of the rating devices 110A-N may be a device such as a laptop, a mobile phone, a tablet and/or a personal computer. The work selection system 112 tracks the ratings provided by each of the plurality of evaluators 108A-N for the work submitted by each of the content creators 102A-M. In one embodiment, the work selection system 112 may disallow the plurality of evaluators 108A-N from providing multiple ratings on any work submitted by the content creators 102A-M.

During the process of the selection event, the work selection system 112 selects the set of submitted works for display if they meet the predefined rating criteria. The selected works are combined, arranged and organized into a separate package referred to as a display package. The display package is associated with a release time and date that is the same as the time and date corresponding to the selection event performed by the work selection system 112 which led to a creation of the display package.

The display package is transferred to the display and archive server 114 after the creation of a release package by the work selection system 112. The display and archive server 114 thereby periodically receives the display package from the work selection system 112. In yet another embodiment, the display and archive server 114 is accessed by a plurality of visitors through the network 106. In order to access the display package released over the course of time, the plurality of visitors interacts with access devices such as a laptop, a mobile phone, a tablet, and/or a personal computer.

Figure 2:
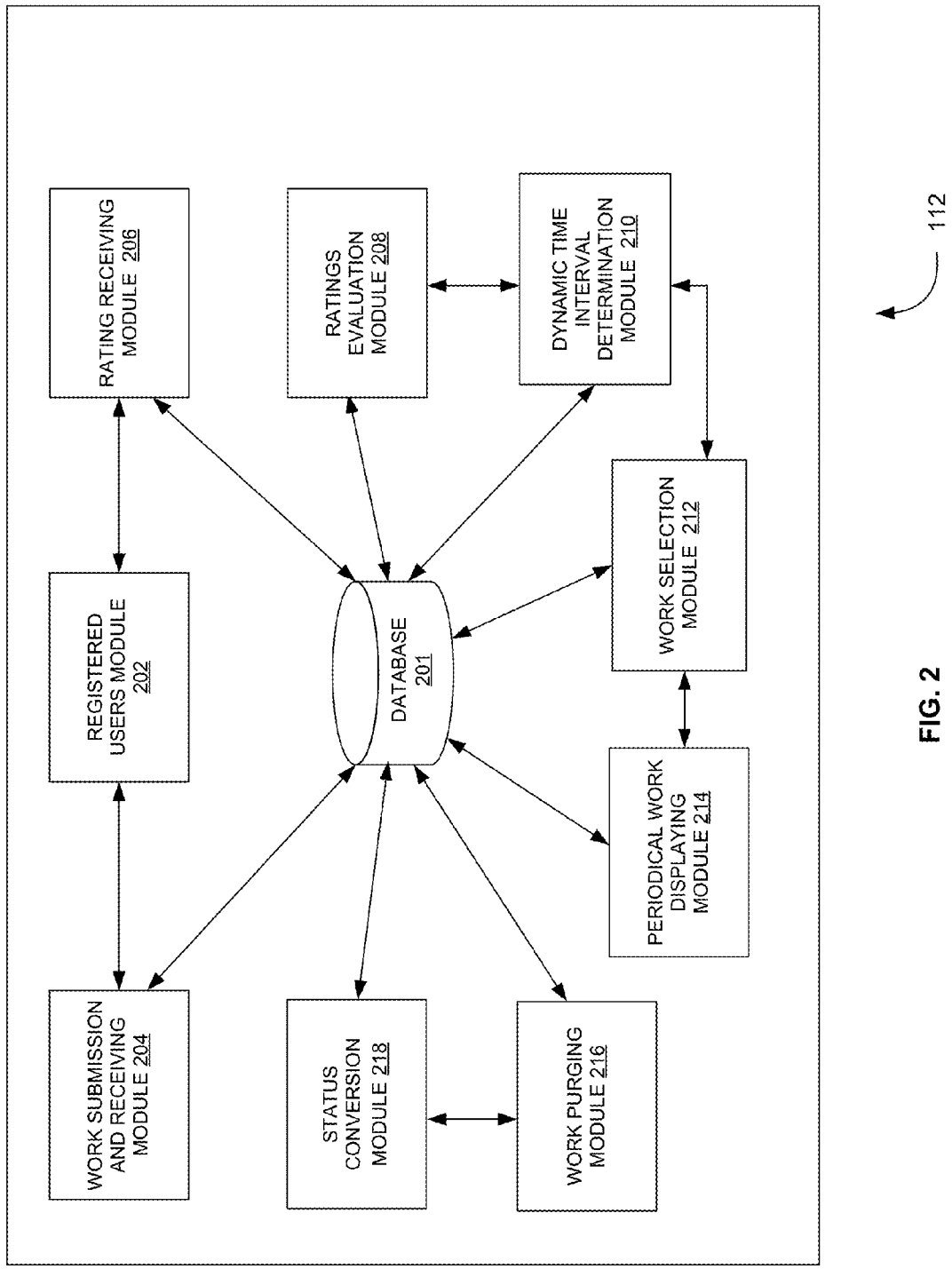
FIG. 2 illustrates an exploded view of the work selection system of FIG. 1 according to an embodiment herein.

FIG. 2 illustrates an exploded view of the work selection system 112 of FIG. 1 according to a first embodiment herein. The work selection system includes a database 201, a registered user and login module 202, a work submission and receiving module 204, a rating receiving module 206, a ratings evaluation module 208, a dynamic time interval determination module 210, a work selection module 212, a periodical work displaying module 214, a work purging module 216, and a status conversion module 218. The database 201 stores the predefined rating criteria and their threshold values. The registered user and login module 202 enables registered users (e.g. the plurality of content creators 102A-M and the plurality of evaluators 108A-N) to login to the work selection system 112. After logging in, the registered users may submit the work or provide ratings to the work submitted by other registered users. Thus, the registered users who are logged in can play the role of one of the plurality of content creators 102A-M or one of the plurality of evaluators 108A-N. The registered users and login module 206 facilitates creation of a profile by each of the registered users. The profile may contain details such as a photograph and any information of the registered users that is visible to a plurality of visitors and other registered users. Each registered user has a unique user name or identity.

The database 201 stores all the content submitted by the plurality of content creators 102A-M, the predefined criteria for accepting a submission, the necessary information to determine if a submitted work meets the set of predefined rating criteria for selection, all the necessary information of the registered users, details of the all the ratings provided to all the submissions, periodicity of the periodical release of the display package, the time period any submission needs to be active for rating. And finally the status of each submission determining whether it is active for rating or not.

The submission and receiving module 204 receives submissions from the content creators 102A-M through the network 106 and updates the database 201 with any newly received submission. The submission receiving module 204 records into the database 201 the corresponding unique user-names associated with the plurality of content creators 102A-M for each submission. Further, the submission receiving module 204 records the time and date of each submission and other details corresponding to the submissions into the database 201.

The rating receiving module 206 obtains the ratings from the plurality of evaluators 108A-N through the network 106 for the submissions that are still available for rating. The rating receiving module 206 may record into the database 201 (i) the values of the ratings provided by the plurality of evaluators 108A-N for each submission, and (ii) the username of the evaluator and all the details associated with each submission that was also processed by the submission and receiving module 204 at the time of the respective submission.

The ratings evaluation module 208 performs an evaluation of the ratings received form the plurality of evaluators 108A-N. The dynamic time interval determination module 210 determines at least one of (a) the time period when the submitted works are to be kept available for the ratings or (b) a time period between a first time of release and a second time of release of the periodically curated collection, for a given number of times a submission has to be considered for being part of a display package. The dynamic time interval determination module 210 determines the time for performing the evaluation, which is done periodically. Then all the submissions will be able to obtain ratings from the plurality of evaluators 108A-N for an equal amount of time if $(N-2)*Tp<Tw\leq(N-1)*Tp$. The date and time for executing the process is determined from the periodicity and from the date and time of the previous such evaluation. Thus after setting the time and date of the evaluation and the periodicity of occurrence of such a process, the time and date of all future evaluations may be determined. During each instance of the time of performing the evaluation, the ratings evaluation module 208 may calculate the aggregate and/or average ratings of each submission available in the database 201.

The work selection module 212 performs a selection based on a set of predefined rating criteria when the evaluation is completed. The submitted works may belong to various categories based on the size of the work, the subject matter addressed by the submitted work etc. The work selection module 212 may perform the selection taking into account the category each of the works belongs to, its average and total rating. Using these parameters and the set of predefined rating criteria for each category, the work selection module 212 selects a set of submitted works all of which satisfy the corresponding predefined criteria. In one embodiment, this may include the best five or ten works or any threshold number of works assigned to each category. Another variation may be the top five percent, ten percent or any other percentile assigned to each category. The works may be ranked against each other based on their total rating, average rating or any combination of the two. A filter that requires each submission of the work to satisfy a minimum average rating, a minimum total rating, or any combination of the two may precede the final selection itself.

Upon completion of each periodic selection process, the selected works are compiled and transformed by the periodical work displaying module 214 into a format or arrangement that is appealing to the visitor, that can be accessed easily and its contents may be easily recovered through search engines, based on the time of selection, based on category the work belongs to etc. This transformed version is referred to as the display package, in one embodiment. After this transformation is completed, the periodical work displaying module 214 transfers the display package to the display and archive server 114.

Immediately after the display package is created and transferred to the archive and display server 114, the work purging module 216 removes all the submitted works that are either no longer available for rating, or have been selected to be part of the display package by the work selection module 212 from the database 201.

The status conversion module 218 keeps track of the time of submission of any work submitted by the plurality of content creators 102A-M. Each of the works submitted by the plurality of content creators 102A-M remains active for rating for a predetermined time period $T_w$. The status conversion module 218 accesses the value of $T_w$ stored in the database 201. After the lapse of the predetermined time period $T_w$ following the submission of any work from the submission and receiving module 204, the status conversion module 218 converts the status and in that process makes the work unavailable for rating by the plurality of evaluators 108A-N.

In another embodiment, the work selection system 112 performs a selection event periodically when ratings of all the submitted works contained within the work selection system 112 are evaluated. The time and periodicity of the selection event are predetermined. In the process of the selection event, an aggregate of ratings provided by the plurality of evaluators 108A-N for each submitted work is calculated. A submitted work may be deemed selected for display and/or publication by the work selection system 112 when its aggregate and average rating exceeds predefined criteria. The predetermined rating criteria may be determined based on a relative or an absolute scale, and may be different based on a category or a subcategory that the work belongs to. The subcategory itself may be predetermined at the time of submission of the work and may be based on features such as the length or size of the submission, the specific subject or topic that the work is associated with or any other possible features suitable for classification.

In one embodiment, there are two time periods involved in the overall process. They are (i) the time $T_w$ for which the work is kept active for rating, and (ii) the time $T_p$ for periodicity of release of the display package into the display and archive server 114. The values of the $T_w$ and the $T_p$ may be related to each other such that there is a fair balance and equal opportunity for selection between submissions made at different times by the plurality of content creators 102A-M.

If it is required that the number of times, that a submission may be considered for being part of a display package is equal to N, then all the submissions will be able to obtain ratings from evaluators for an equal amount of time if $(N-2)*Tp<Tw\leq(N-1)*Tp$, wherein N is at least two. In one embodiment, N is greater than or equal to 2.

For example, if the value of Tw is less than that of $(N-2)*Tp$ then the submission cannot be considered for N number of times. This is because it will undergo a status change from being available for rating to no longer being available for rating before the (N−1)th possible selection during which it will get necessarily purged and will no longer be available for the next or Nth selection event. Thus it will not meet the original requirement that the submission may be considered for selection N times. Hence Tw has to be greater than $(N-2)*Tp$.

If the value of Tw is more than that of $(N-1)*Tp$ then balance and equality in the time for availability for rating between submissions made at different times is not ensured. For example, let us assume that Tp is 10 days, and N=2. If Tw is 15 days, it is more than $(N-1)*Tp=Tp$ for N=2. Assume that selection events will fall on the 10th, 20th and 30th day of a particular month. Consider a work 'X' submitted on the 3rd day of that month and another work 'Y' submitted on the 9th day of that same month. Both work 'X' and work 'Y' will be up for selection on the first selection event, which falls on the $10^{th}$ day of that same month. If neither work 'X' work nor work 'Y' get selected the first time they will be considered for selection on the $20^{th}$ day of the same month. At this point work 'X' would have got the full 17 days of time as available for rating, whereas work 'Y' work would have got only 11 days of time as available for rating. Since N=2, there will be no selection for a third time, and thereby work 'X' work would have had a greater time as available for rating before a final selection. This gives work 'X' an advantage over work 'Y' due to its time of submission and thus violating the conditions of equality and fairness with respect to time available for rating. On the other hand, if Tw is equal or less than Tp*(N−2)=10 in this case, both submission 'X' and 'Y' would get the same 10 days or less as available time for rating before a possible final selection event for work 'X' and work 'Y' respectively. Thus it is may be concluded that, if (N−2)*Tp<Tw≤(N−1)*Tp, then it is ensured that when all the submissions undergo N number of evaluations, the time period each submission gets to be active for rating is one and the same for all the submissions before the final possible Nth evaluation that the submission may undergo.

In one embodiment, the values of N and Tw would be set to N=2 and Tw=Tp respectively. This is an optimum choice in many cases because if N is kept to a minimum value, the work selection system 112 will provide opportunities only for more recently submitted works to be considered as part of the display package, This is particularly advantageous if the subject matter of the submitted work becomes progressively less interesting and relevant with time compared to more recent submissions. Also the maximum value for Tw that satisfies the condition (N−2)*Tp<Tw≤(N−1)*Tp, which ensures equality with respect to time of availability for rating between all submissions made at different times would be Tw=Tp for N=2. This would give a maximum time of exposure to rating for every submission within the constraint of N=2. Keeping the time of exposure to rating at a maximum maximizes the overall rating obtained by the submissions before possible selection for display. This is because it provides greater flexibility to the plurality of evaluators 108A-N with respect to time for providing rating to the submissions, ensuring greater participation by the plurality of evaluators 108A-N. Greater participation by the plurality of evaluators 108A-N leads to creation of a display package that is a truer representation of the opinion of the plurality of evaluators 108A-N.

Figure 3:
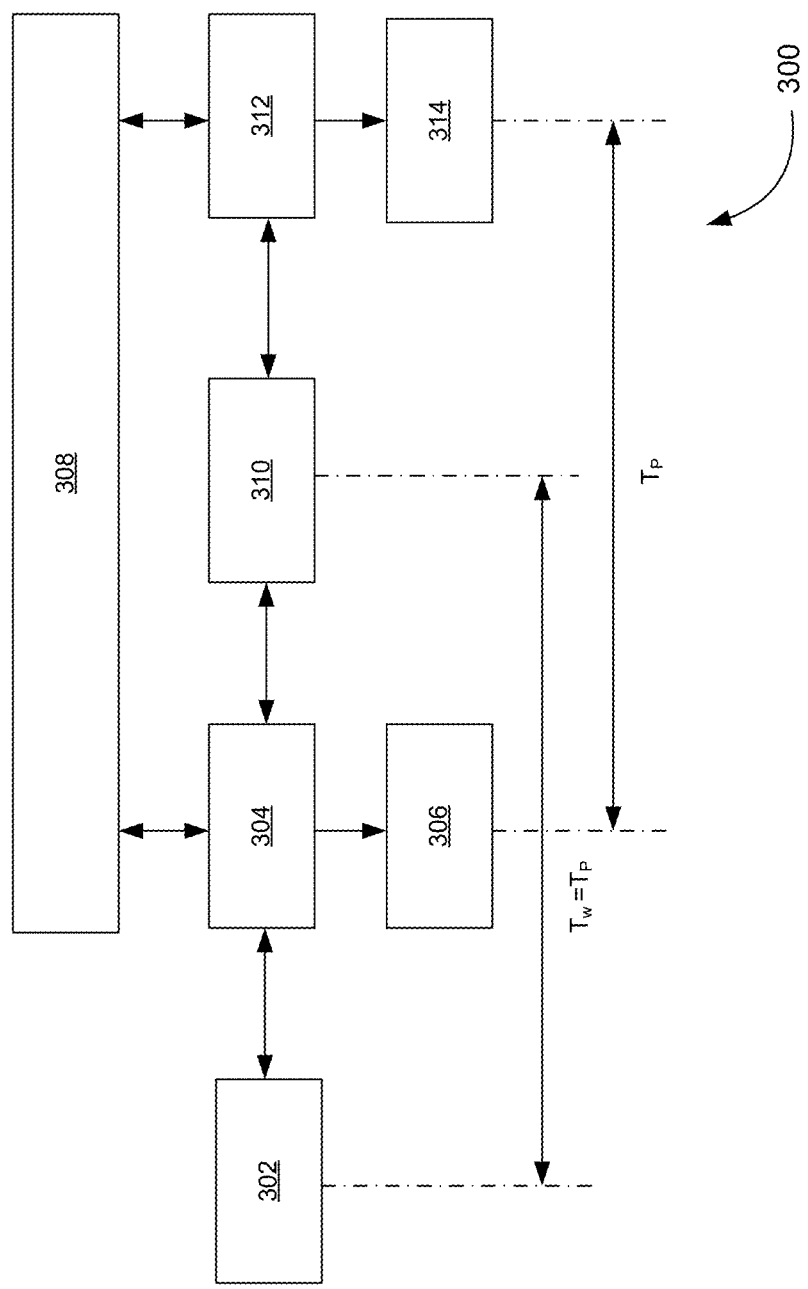
FIG. 3 illustrates an exemplary view of a process flow of the work selection system of FIG. 1 according to an embodiment herein.

With reference to FIG. 2, FIG. 3 illustrates an exemplary view of a process flow of the work selection system 112 of FIG. 1 according to an embodiment herein. Step 302 represents the submission of a work by one content creator, who is a part of 102A-M, into the work selection system 112 for ratings from the plurality of evaluators 108A-N.

At step 304, the work selection system 112 conducts a selection event. The rating evaluation module 208 is used to processes the evaluation of the ratings corresponding to all the submitted work available in the database 201, including the one submitted at step 302. The evaluation of the ratings is immediately followed by possible selection of the work submitted at step 302 by the work selection module 212. This is then immediately followed by release of the curated collection in the form of the display package at step 306 by the periodical work displaying module 214.

If the work submitted at step 302 is selected for display by the work selection module 212 at step 304, it is removed from the database 201 by the work purging module 216 shown as step 308. If the work submitted at step 302 is not selected for display by the work selection module at step 304, it proceeds to step 310. At step 310 the status conversion module 216 makes the work submitted at step 302 no longer available for rating. Step 310 occurs at a time Tw=Tp after the occurrence of step 302.

If the work submitted at step 302 reaches step 310 and becomes no longer available for rating, it then reaches step 312. Step 312 corresponds to a second selection event after step 304 for the work submitted at step 302. Step 312 occurs at a time period Tp after step 304, the previous selection event.

If at step 312, the work submitted at step 302 is selected for display by the work selection module 210, it becomes part of the display package 314, and it also purged from the database 201, shown as step 308 by the work purging module 216. If at step 312, the work submitted at step 302 is not selected for display by the work selection module 212, it is still purged from the database 201, shown as step 308 by the work purging module. This is because, at this second selection event, it is no longer available for rating, whereas in the first selection event corresponding to step 304, the submitted work was still available for rating by the plurality of evaluators 108A-N.

Figure 4A:
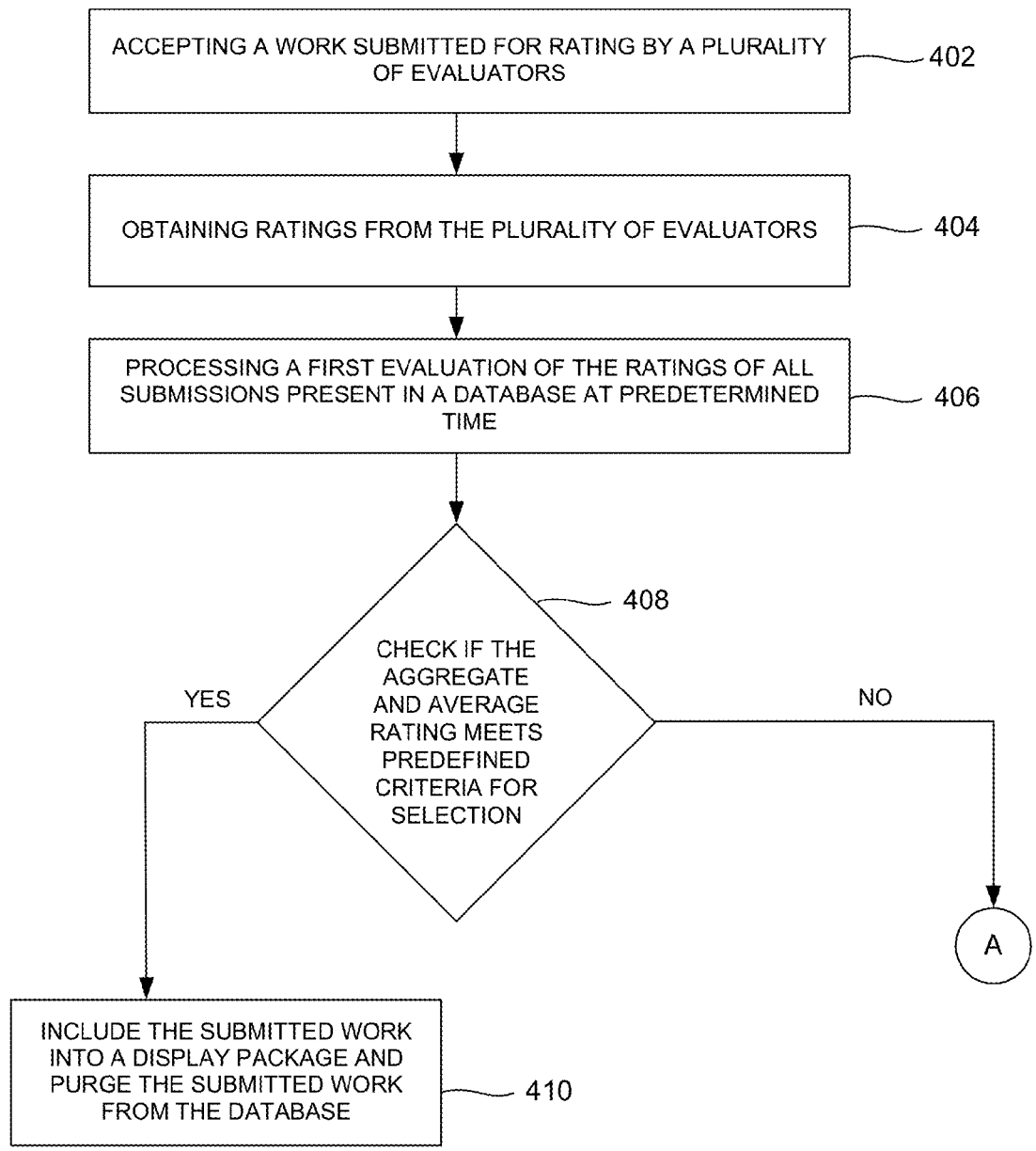
FIGS. 4A and 4B are flow diagrams illustrating a method for automatically selecting or rejecting, categorizing, and releasing the work into a periodically curated collections using the work selection system of FIG. 1 according to a first embodiment herein.
Figure 4B:
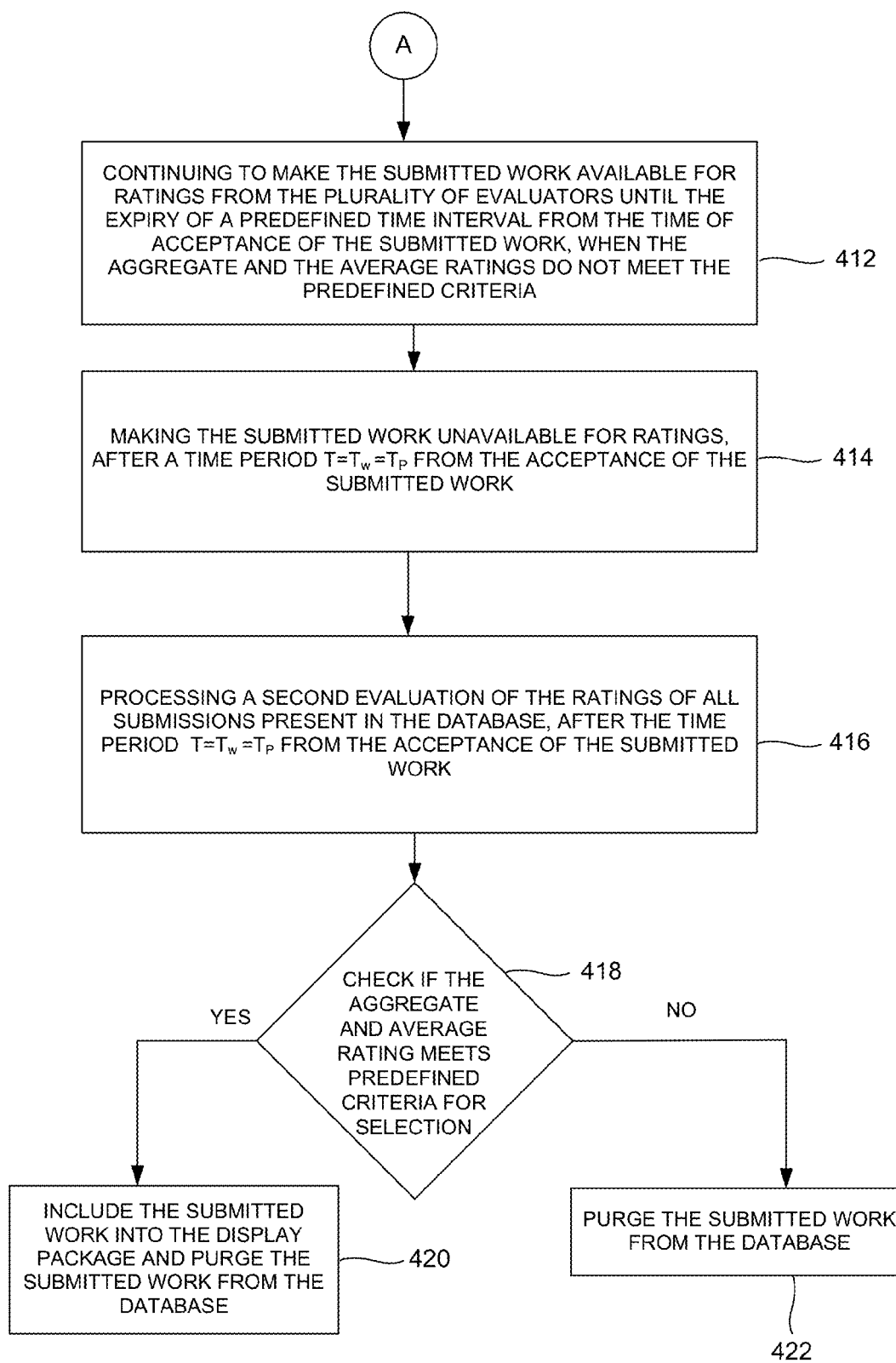

FIGS. 4A and 4B are flow diagrams illustrating a method for automatically selecting or rejecting, categorizing, and releasing the work into at the most one of the periodically curated collection using the work selection system 112 of FIG. 1 according to an embodiment herein. At step 402, the work selection system 112 accepts the submission of a work by one of the content creators belonging 102A-M for ratings by the plurality of evaluators 108A-N. At step 404, the work selection system 112 obtains ratings from the plurality of evaluators 108A-N. At step 406, the work selection system 112 processes the evaluation of the ratings corresponding to all the submitted work for the release of the periodical, curated collection or display package.

At step 408, the work selection system checks if the average and aggregate, rating for each submitted work meets the predefined criteria for selection or not. Accordingly, the work submitted at step 402 may be (a) selected if it meets the predefined rating criteria or (b) not selected if it does not meet the predefined rating criteria. In the case of (a) the work submitted at step 402 goes to step 410 where it becomes part of the display package, and is simultaneously purged form the database 201. In case of (b) the submitted work goes to step 412, where it continues to remain available for rating.

In step 414, the work submitted at step 402, is no longer available for rating. Step 414 occurs after a time T=Tw=Tp has lapsed following the submission at step 402. In step 416, the procedure carried out in step 406 is repeated, where an evaluation of all the submitted work is carried. Step 416 takes place after a time period T=Tp=Tw has lapsed following step 406.

The procedure of step 418 is identical to step 408 where a check is made if the work submitted at step 402 meets the predefined criteria. If the predefined rating criteria are met, the work submitted at step 402 goes to step 420 where it becomes part of the display package and at the same time is purged from the database 201. If the predefined rating criteria are not met the work submitted at step 402, goes to step 422, where it is still purged from the database 201 because during the second selection event, the submitted work is no longer available for rating.

Figure 5A:
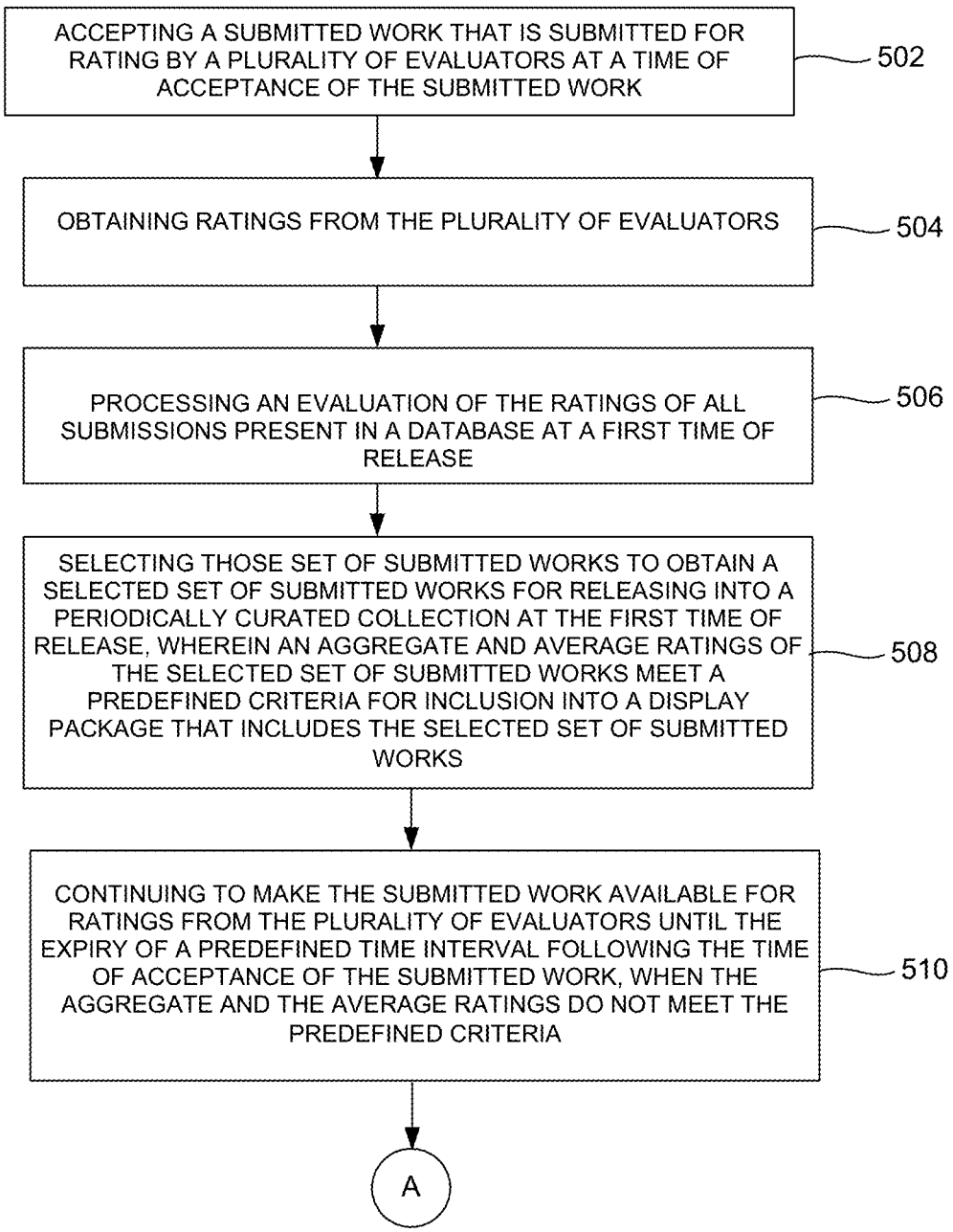
FIG. 5A and FIG. 5B are flow diagrams that illustrates a method for automatically selecting or rejecting, categorizing, and releasing the work into the periodically curated collections using the work selection system of FIG. 1 according to a second embodiment herein.
Figure 5B:
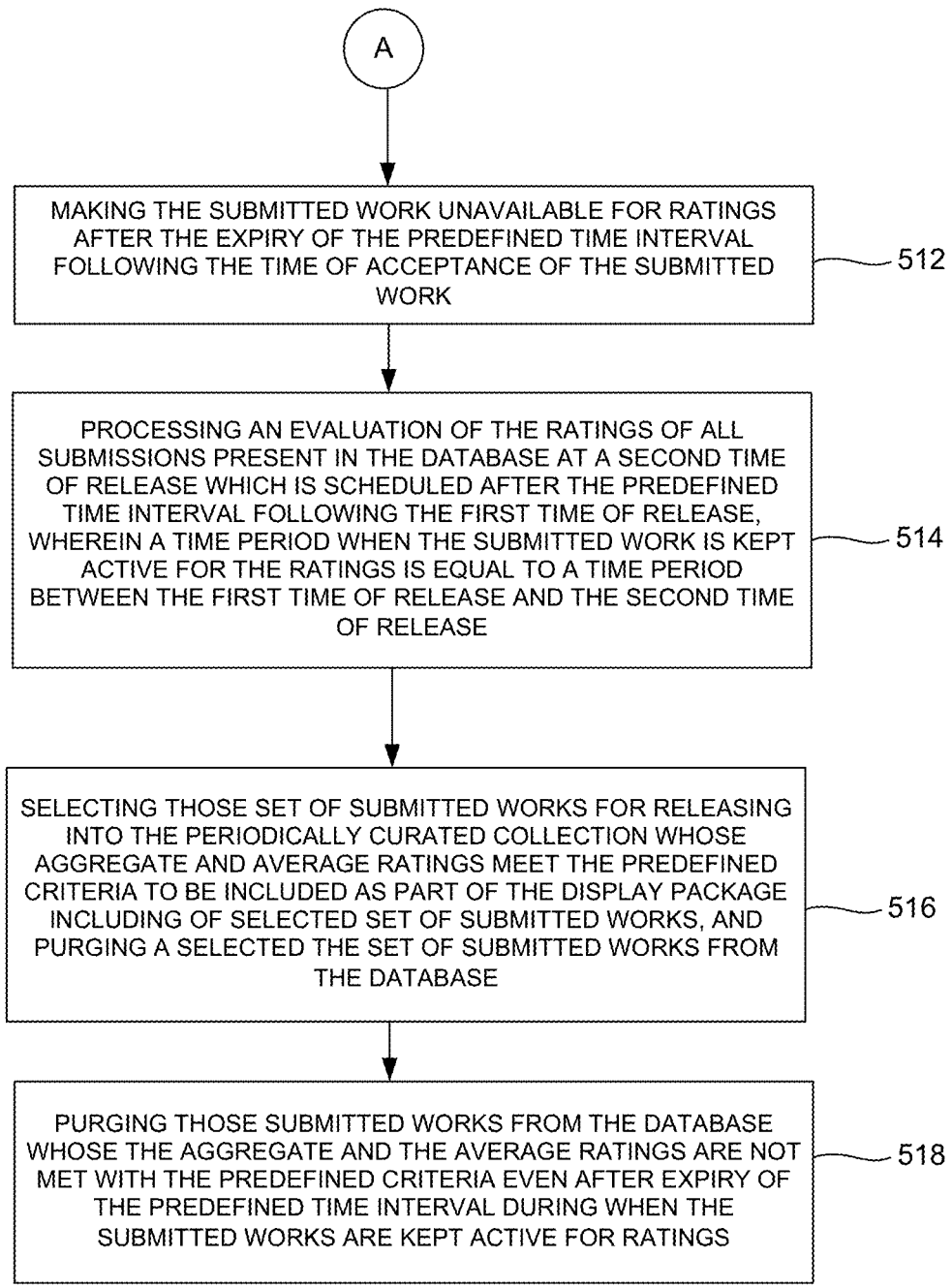

FIG. 5A and FIG. 5B are flow diagrams that illustrates a method for automatically selecting or rejecting, categorizing, and releasing the work into at least one of periodical curated collections using the work selection system 112 of FIG. 1 according to a second embodiment herein. At step 502, the work selection system 112 accepts the submitted work that is submitted for rating by the plurality of evaluators 108A-N at the time of acceptance of the submitted work. At step 504, the work selection system 112 obtains the ratings from the plurality of evaluators 108A-N. At step 506, the work selection system 112 processes the evaluation of the ratings of all submissions present in the database 201 at the first time of release. At step 508, the work selection system 112 selects those set of submitted works to obtain a selected set of submitted works for releasing into the periodically curated collection at the first time of release wherein the aggregate and the average ratings of the selected set of submitted works meet the predefined criteria for inclusion into the display package that includes the selected set of submitted works.

At step 510, the work selection system 112 continues to make the submitted work available for ratings from the plurality of evaluators 108A-N until the expiry of the predefined time interval from the time of acceptance of the submitted work, when the aggregate and the average ratings do not meet the predefined criteria. At step 512, the work selection system 112 makes the submitted work unavailable for ratings after the expiry of the predefined time interval following the time of submission. At step 514, the work selection system 112 processes an evaluation of the ratings of all submissions present in the database 201 at the second time of release which is after the predefined time interval from the first time of release. In one embodiment, a time period of the submitted work is kept active for the ratings is equal to a time period between the first time of release and the second time of release. At step 516, the work selection system 112 selects those set of submitted works for releasing into the periodically curated collection whose the aggregate and the average ratings meet the predefined criteria to be included as part of the display package including of selected submitted works. At step 518, the work selection system 112 purges those submitted works from the database 201 whose the aggregate and the average ratings are not met with the predefined criteria even after expiry of the predefined time interval when the submitted works are kept active for ratings.

Figure 6:
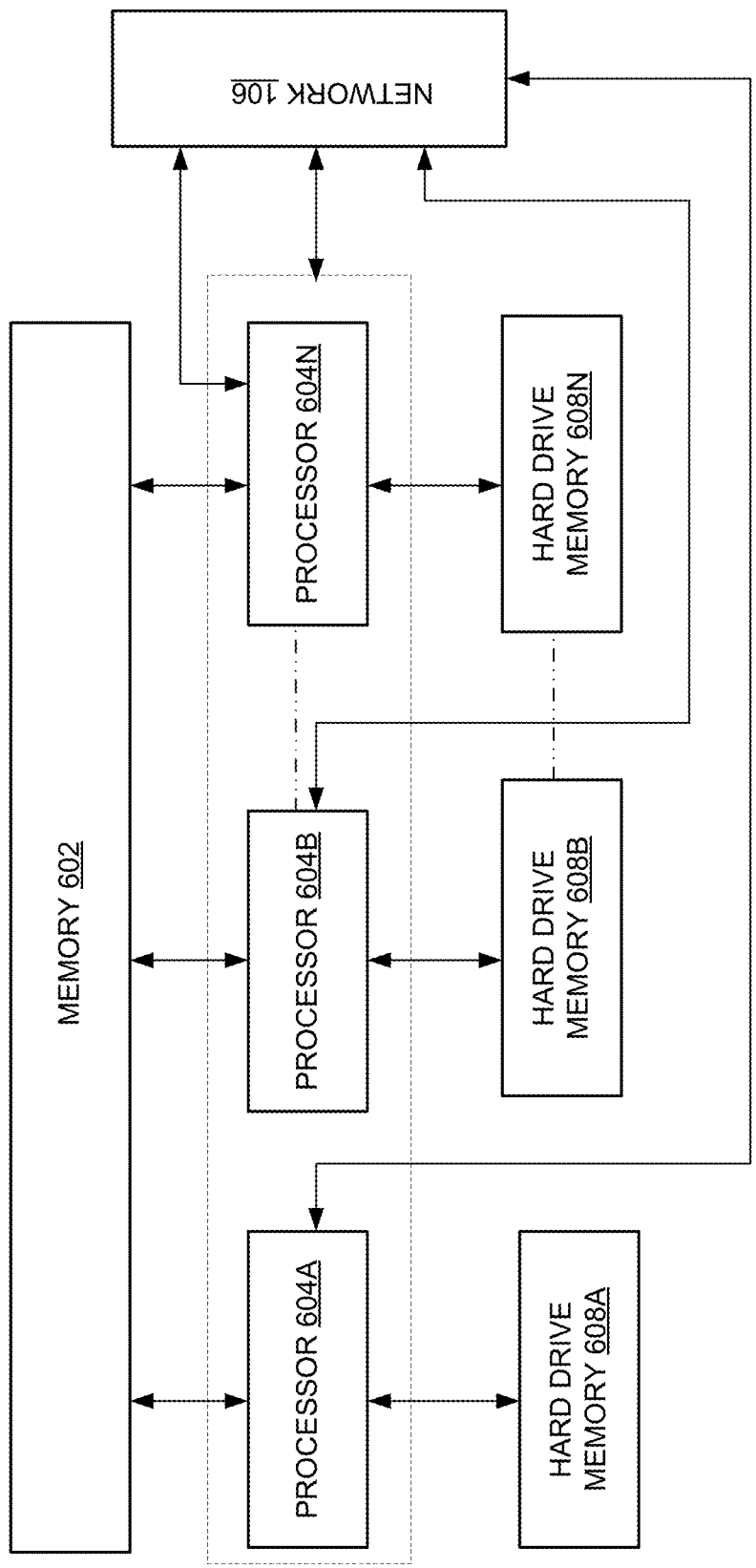
FIG. 6 is a schematic diagram of a computer architecture of the work selection system of FIG. 1 according to the embodiments herein.

FIG. 6 illustrates an expanded view of the work selection system 112 of FIG. 1 according to the embodiments herein. Each of the submission devices 104A-N having network connectivity 106 submits work to any of the processors 604A-N and is persisted on the data storage device 608A-N (e.g. hard drive memory). The processors 604A-N may also enable digital content to be consumed in the form of video for output via one or more displays or audio for output via speaker and/or earphones. Each of the processors 604A-N have access to a memory 602 that facilitates activity of the registered users as well as functioning of the modules of FIG. 2. The processors 604A-N may also carry out the methods described herein and in accordance with the embodiments herein.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The hard drive memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
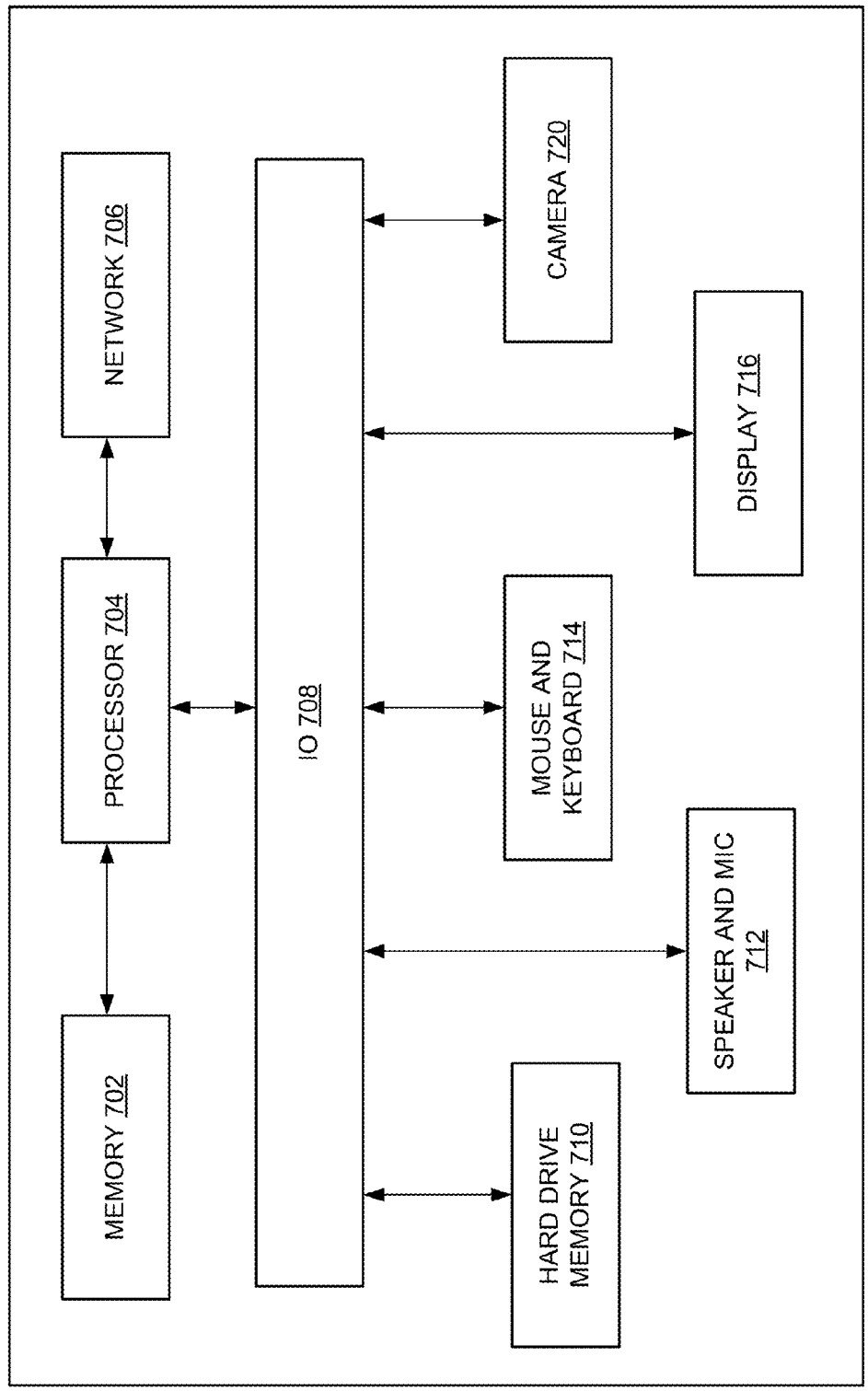
FIG. 7 is a schematic diagram of computer architecture of both submission devices and rating devices of FIG. 1 used in accordance with the embodiments herein.

FIG. 7 is a schematic diagram of the architecture of the submission devices 104A-M as well as rating devices 110A-N used in accordance with the embodiments herein. This schematic drawing illustrates a hardware configuration of an information handling/computer system in accordance with the embodiments herein. The system includes a memory 702, at least one processor 704, a network 706, an input/output adapter 708, a hard drive memory 710, a speaker and microphone 712, a mouse and keyboard 714, a display 716, and a camera 720. The I/O adapter 708 can connect to peripheral devices, such as the hard drive memory 710, the speaker and microphone 712, the mouse and keyboard 7614, the display 716, and the camera 720 gather user input, or other program storage devices that are readable by the system. The system can read the inventive instructions on the program storage devices and follow these instructions to execute the methodology of the embodiments herein.

Thus the work selection system 112 provides an effective and automated filter on the quality of the submitted work for the purpose of curating and selection into a display package. The work selection system 112 tracks the ratings and prevents multiple ratings by a single evaluator. The work selection system 112 displays the work on a periodical basis in a manner that ensures equality amongst all the work submitted by the content creators 102A-M. In addition, the work selection system 112 is capable of purging content not favored by the public on a regular basis, and those that receive favor must remain archived, easily accessible and available for the public to revisit for the purpose of entertainment or conducting research in the future, without having to undergo repeated searches and sifting through large volumes of data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for automated periodical selection, rejection, categorization, and release of a work into a periodically curated collection, wherein said method comprises
accepting a submitted work that is submitted for rating by a plurality of evaluators at a time of acceptance of said submitted work;
obtaining ratings from said plurality of evaluators;
processing an evaluation of said ratings of all submissions present in a database at a first time of release;
selecting those set of submitted works to obtain a selected set of submitted works for releasing into said periodically curated collection at said first time of release, wherein an aggregate and average ratings of said selected set of submitted works meet a predefined threshold ratings for inclusion into a display package that comprises said selected set of submitted works and then purging said selected set of submitted works from said database;
continuing to make said submitted work available for ratings from said plurality of evaluators until the expiry of a predefined time interval following said time of acceptance of said submitted work, when said aggregate and said average ratings do not meet said predefined threshold ratings;
making said submitted work unavailable for ratings after the expiry of said predefined time interval following said time of acceptance of said submitted work, wherein said predefined time interval is expired based on at least one of (i) a number of said evaluations of said submitted works that is required to undergo, (ii) said time period between subsequent evaluations or (iii) a value of said predefined time interval during when said submitted works are kept active for ratings;
processing an evaluation of said ratings of all submissions present in said database at a second time of release which is scheduled after said predefined time interval following said first time of release, wherein a time period when said submitted work is kept active for said ratings is equal to a time period between said first time of release and said second time of release;
selecting those set of submitted works for releasing into said periodically curated collection whose aggregate and average ratings meet said predefined threshold ratings to be included as part of said display package comprising of selected set of submitted works, and purging said selected set of submitted works from said database; and
purging those submitted works from said database whose said aggregate and said average ratings are not met with said predefined threshold ratings even after expiry of said predefined time interval during when said submitted works are kept active for ratings.

2. The method of claim 1, wherein a time period between subsequent times of release, and a value of said predefined time interval during when said submitted works are kept active for ratings are determined by the formula $(N-2)*Tp < Tw \leq (N-1)*Tp$ wherein N is a number of said evaluations said submitted work is required to undergo, Tp is said time period between subsequent evaluations, and Tw is said value of said predefined time interval during when said submitted works are kept active for ratings.

3. The method of claim 2, further comprising
filtering each submission of said work to satisfy a minimum average rating or a minimum total rating prior to a final selection of said submitted work; and
disallowing any evaluator belonging to said plurality of evaluators from providing more than one rating on said submitted work.

4. A work selection system that automatically accepts, selects, rejects, categorizes, and releases submitted works into a periodically curated collection, wherein said work selection system comprises
a hard drive memory that stores a database, wherein said database stores a set of modules, said submitted works, ratings of said submitted works, and predefined threshold ratings; and
a processor that executes said set of modules, wherein said set of modules comprises
a work submission and receiving module, implemented by said processor, that accepts said submitted works for ratings by a plurality of evaluators and records a time of acceptance of each of said submitted works;
a rating receiving module, implemented by said processor, that receives ratings for said submitted works from said plurality of evaluators for works that are available for rating;
a ratings evaluation module, implemented by said processor, that evaluates said ratings of said submitted works by calculating at least one of total or average ratings of each submission in the database within a time period when said submitted works are to be kept available for said ratings;
a dynamic time interval determination module, implemented by said processor, that determines at least one of (a) said time period when said submitted works are to be kept available for said ratings or (b) a time period between a first time of release and a second time of release of said periodically curated collection, for a given number of times a submission has to be considered for being part of a display package, wherein a predefined time interval is expired based on at least one of (i) a number of said evaluations said submitted works that is required to undergo, (ii) said time period between subsequent evaluations or (iii) a value of said predefined time interval during when said submitted works are kept active for ratings;
a work selection module, implemented by said processor, that selects and updates said periodically curated collection from said submitted works at said first time of release and said second time of release based on a comparison of said ratings with said predefined threshold ratings; and
a periodical work displaying module, implemented by said processor, that periodically releases said periodically curated collection into updated display packages at said first time of release and said second time of release.

5. The work selection system of claim 4, wherein said work selection system further comprises
a status conversion module, implemented by said processor, that makes each of said submitted works unavailable for rating after a lapse of a predefined time interval following each said time of acceptance of each of said submitted works.

6. The work selection system of claim 5, wherein said work selection system further comprises
a work purging module, implemented by said processor, that removes from said database (a) submitted works which are selected as part of said updated display packages at said first time of release and said second time of release, and (b) submitted works whose aggregate and average ratings do not meet said predefined threshold ratings following said first time of release and said second time of release and have also been made unavailable for rating after said lapse of said predefined time interval following each said time of acceptance of each of said submitted works.

7. The work selection system of claim 6, wherein said dynamic time interval determination module determines said at least one of (a) said time period when said submitted works are to be kept available for said ratings or (b) said time period between a first time of release and said second time of release of said periodically curated collection based on the formula $(N-2)*Tp<Tw\leq(N-1)*Tp$ wherein N is a number of evaluations a submitted work is required to undergo, Tp is a time period between subsequent times of release, and Tw is said predefined time interval during when said submitted works are kept active for ratings.

8. The work selection system of claim 7, wherein said submission receiving module verifies said submitted works to (i) accept said submitted works when said submitted works meet predefined specifications and (ii) reject said submitted works when said submitted works do not meet said predefined specifications and categorizes said submitted works into a specific channel for ratings by said plurality of evaluators.

9. The work selection system of claim 8, wherein said time period when said submitted work is kept active for said ratings and said time interval for periodicity of release of said submitted work are related to each other such that an equality is always maintained with respect to time of exposure for ratings between the submissions of said work made at different times.

10. The work selection system of claim 9, wherein said work selection module categorizes each of the submission and said aggregate and average ratings at said time of release to select those submitted works whose said aggregate and average ratings meet said predefined threshold ratings.

11. The work selection system of claim 10, wherein said ratings receiving module disallows any evaluator belonging to said plurality of evaluators from providing more than one rating on said submitted work.

12. One or more non-transitory computer readable storage mediums storing one or more sequences of instructions, which when executed by one or more processors, causes automated periodical selection, rejection, categorization, and release of a work into a periodically curated collection by performing the steps of:
   accepting a submitted work that is submitted for rating by a plurality of evaluators at a time of acceptance of said submitted work;
   obtaining ratings from said plurality of evaluators;
   processing an evaluation of said ratings of all submissions present in a database at a first time of release;
   selecting those set of submitted works to obtain a selected set of submitted works for releasing into said periodically curated collection at said first time of release, wherein an aggregate and average ratings of said selected set of submitted works meet a predefined threshold ratings for inclusion into a display package that comprises said selected set of submitted works and then purging said selected set of submitted works from said database;
   continuing to make said submitted work available for ratings from said plurality of evaluators until the expiry of a predefined time interval following said time of acceptance of said submitted work, when said aggregate and said average ratings do not meet said predefined threshold ratings;
   making said submitted work unavailable for ratings after the expiry of said predefined time interval following said time of acceptance of said submitted work, wherein said predefined time interval is expired based on at least one of (i) a number of said evaluations said submitted works that is required to undergo, (ii) said time period between subsequent evaluations or (iii) a value of said predefined time interval during when said submitted works are kept active for ratings;
   processing an evaluation of said ratings of all submissions present in said database at a second time of release which is scheduled after said predefined time interval following said first time of release, wherein a time period when said submitted work is kept active for said ratings is equal to a time period between said first time of release and said second time of release;
   selecting those set of submitted works for releasing into said periodically curated collection whose aggregate and average ratings meet said predefined threshold ratings to be included as part of said display package comprising of selected set of submitted works, and purging said selected set of submitted works from said database, wherein a time period between subsequent evaluations, and a value of said predefined time interval during when said submitted works are kept active for ratings are determined by the formula $(N-2)*Tp<Tw\leq(N-1)*Tp$, wherein N is a number of said evaluations said submitted work may undergo, Tp is said time period between subsequent evaluations, and Tw is said value of said predefined time interval during when said submitted works are kept active for ratings; and
   purging those submitted works from said database whose said aggregate and said average ratings are not met with said predefined threshold ratings even after expiry of said predefined time interval during when said submitted works are kept active for ratings.

13. The one or more non-transitory computer readable storage mediums storing one or more sequences of instructions of claim 12, further causes:
   filtering each submission of said work to satisfy a minimum average rating or a minimum total rating prior to a final selection of said submitted work; and
   disallowing any evaluator belonging to said plurality of evaluators from providing more than one rating on said submitted work.

* * * * *